United States Patent [19]

Yamamoto

[11] Patent Number: 4,639,746
[45] Date of Patent: Jan. 27, 1987

[54] IMAGE RECORDING APPARATUS
[75] Inventor: Mitsuru Yamamoto, Yokohama, Japan
[73] Assignee: Canon Kabushiki Kaisha, Tokyo, Japan
[21] Appl. No.: 624,708
[22] Filed: Jun. 26, 1984
[30] Foreign Application Priority Data Jul. 6, 1983 [JP] Japan ................. 58-122971

[51] Int. Cl.[4] ............... G01D 15/18; G01D 15/10
[52] U.S. Cl. .................. 346/140 R; 346/76 PH
[58] Field of Search .............. 346/140 PD, 76 PH
[56] References Cited

U.S. PATENT DOCUMENTS

| 4,385,302 | 5/1983 | Moriguchi et al. | 346/76 PH |
| 4,389,652 | 6/1983 | Fischbeck | 346/140 PD X |
| 4,415,909 | 11/1983 | Italiano et al. | 346/140 PD |
| 4,446,470 | 5/1984 | Sugiyama et al. | 346/140 PD |

Primary Examiner—George H. Miller, Jr.
Attorney, Agent, or Firm—Fitzpatrick, Cella, Harper & Scinto

[57] ABSTRACT

An image recording apparatus comprises ink jet recording heads; a carriage for moving and scanning those ink jet heads; and a data recording unit for recording character data such as the date and the like in a blank portion other than a image recording region of the recording medium by use of the ink jet heads which are in this blank portion while the carriage is scanning. The character data is recorded (generally in black) by at least the one ink jet head which is arranged at the endmost portion in the direction of arrangement of the ink jet heads. Since the character data can be recorded in the blank portion while the image is being recorded in the image recording region, the total recording time can be reduced.

19 Claims, 9 Drawing Figures (PRIOR ART)
FIG. 1

IMAGE RECORDING APPARATUS

BACKGROUND OF THE INVENTION

1. Field of the Invention

The present invention relates to an image recording apparatus provided with a plurality of recording heads and, more particularly, to an image recording apparatus which can record character data such as the date and a like in the blank portion other than an image recording region of a recording medium while recording the image in the image recording region of the recording medium.

2. Description of the Prior Art

Figure 1:
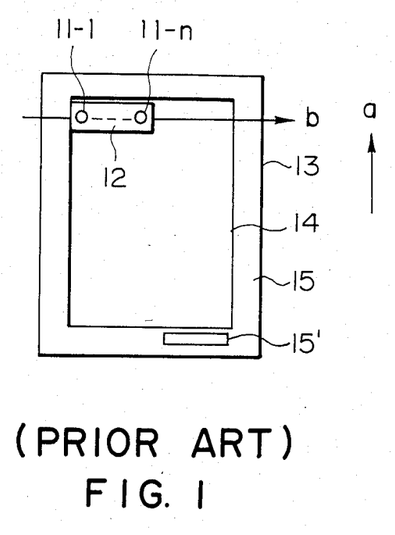
FIG. 1 is a plan view showing a conventional recording medium and recording heads provided in a carriage.

Generally, in conventional image recording apparatus for recording characters, graphic images and the like, as shown in FIG. 1, a carriage 12, in which a plurality of recording heads 11-1 to 11-n are horizontally arranged, is scanned in the horizontal direction as indicated by an arrow b relative to a recording medium 13, and after recording one line, the recording medium 13 is moved in the direction of an arrow a, thereby recording image information.

Character data such as the date and the like can be recorded in a blank portion 15 other than an image recording region 14 of the recording medium 13 by use of such a conventional image recording apparatus. However, after the image is recorded in the image recording region 14 of the recording medium 13, the scanning operation to record the character data such as the date and the like in the blank portion 15 is separately executed. For example, in the case of recording character data in a blank portion 15', upon completion of recording of image information, the recording heads 11 are scanned a few times in the direction of the arrow b, thereby recording the character data. Due to this, the recording time may become long since, in addition to the time for recording image data in the image recording region 14 of the recording medium 13, it further takes time to record the character data such as the date and the like.

As another technology to record character data such as the date and the like using the foregoing conventional technology, there is a method whereby the character data such as the date and the like is superimposed into the image recorded. However, according to this technology, the artistic sense of the image recorded is lost and it is difficult to read the recorded character data such as the date and the like because its legibility depends upon the contrast relation between the color of the image recorded and the color of the recorded character data such as the date and the like.

SUMMARY OF THE INVENTION

It is an object of the present invention to solve the above-mentioned drawbacks in the conventional technology.

Another object of the invention is to provide an image recording apparatus which can record the character data such as the date and the like by the recording heads which are located on the blank portion of the recording medium while recording the image information by the recording heads which are located on the image recording region of the recording medium.

In more detail, the present invention provides an image recording apparatus which has a plurality of recording heads to record image data in response to input signals and records the image data by relatively scanning the plurality of recording heads with respect to the recording medium. A feature of the image recording apparatus of the invention is that the data such as characters and the like is recorded using the recording heads which exist in the blank portion other than the image recording region of the recording medium while the above-mentioned scanning means is scanning for the recording of the image data.

In addition, in the present invention, the data such as characters may be the character data or graphic image data, and in this specification, it is represented by the term of the character data such as the date and the like. Also, "image" denotes characters or a graphic image.

The above and other objects and features of the present invention will be apparent from the following detailed description in conjunction with the accompanying drawings.

DETAILED DESCRIPTION OF THE PREFERRED EMBODIMENTS

Figure 2:
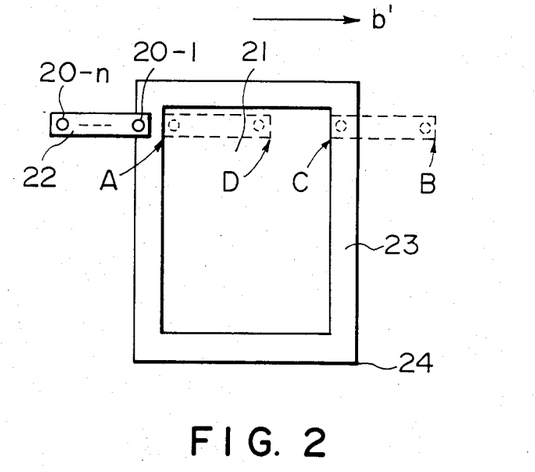
FIG. 2 is a plan view to explain a recording medium and the scanning state of recording heads according to the present invention.

The fundamental concept of the image recording apparatus of the present invention will now be described using FIG. 2. In the diagram, numerals 20-1 to 20-n represent n recording heads; 22 is a carriage provided with the above-mentioned plurality of recording heads; 21 is an image region on a recording medium 24 where an image is recorded in the recording medium; and 23 is a blank portion where no image is formed. In such an image recording apparatus provided with the plurality of recording heads 20-1 to 20-n, the recording head 20-1 has no relation to the recording of the image while the right end portion of the carriage 22 is moving from the position of C indicated by the broken line to the position B. Similarly, the recording head 20-n is not concerned in the recording of the image while the right end portion of the carriage 22 is moving from the position A to the position D.

The present invention intends to record the character data such as the date and the like in the blank portion of the recording medium using the recording heads which exist in the region other than the image recording region of the recording medium after the plurality of recording heads started scanning in the direction of arrangement thereof or before they finish scanning.

Figure 3:
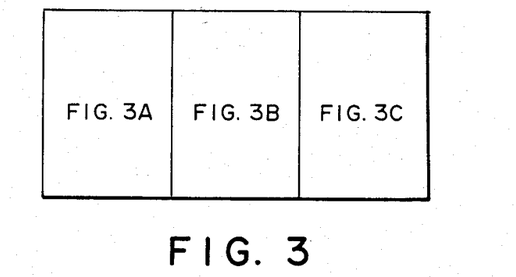
FIG. 3 is a block diagram showing one embodiment of an image recording apparatus of the present invention.
Figure 3A:
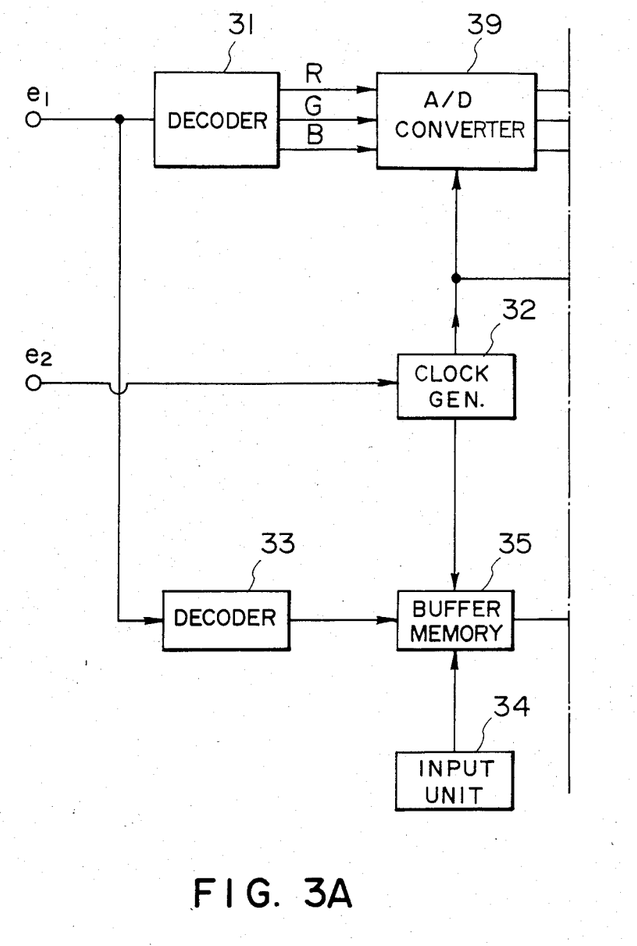
Figure 3B:
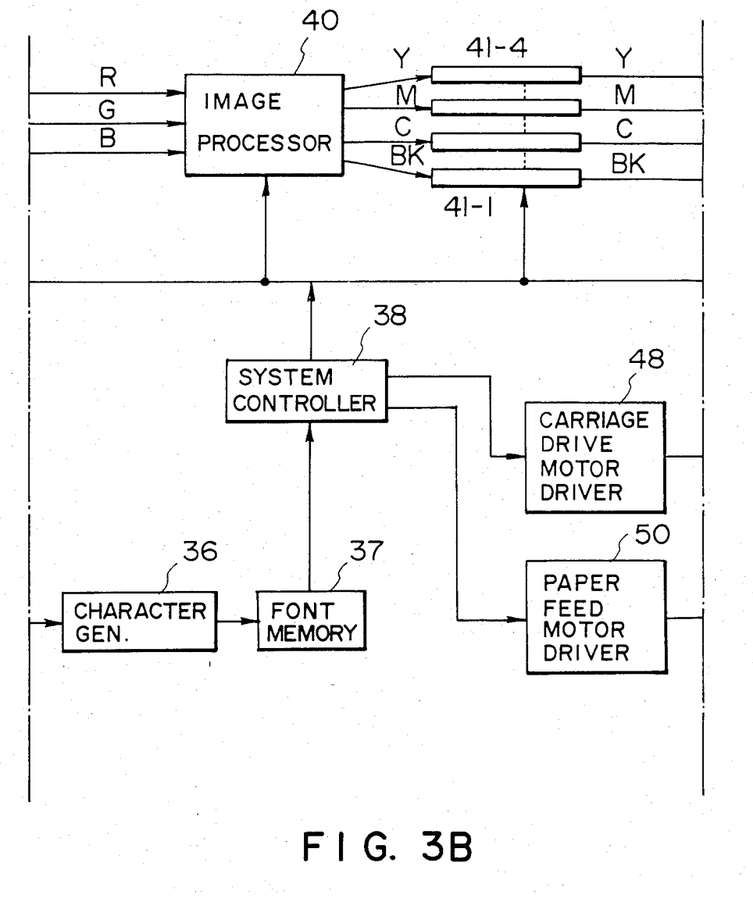
Figure 3C:
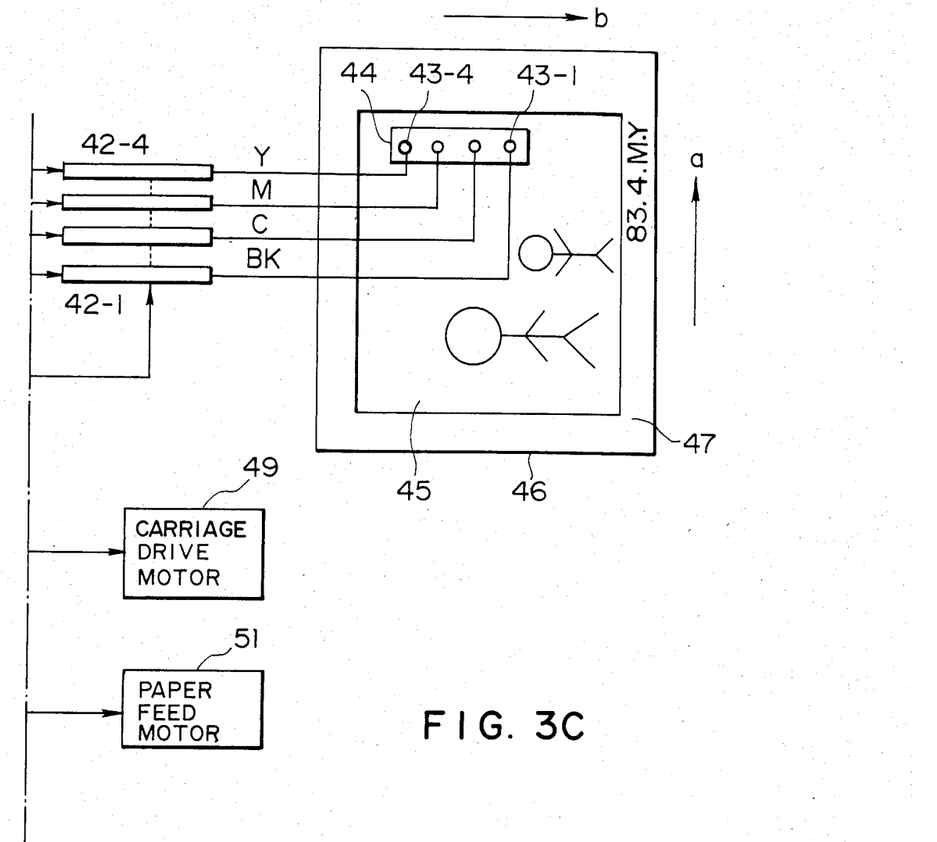

FIG. 3 shows one embodiment of the image recording apparatus of the present invention.

In this diagram, $e_1$ indicates an input terminal to which a video signal indicative of a color image of one sheet and a video signal including a digital signal representative of the character data such as the date and the like which is included in the vertical blanking interval of that video signal are input. $e_2$ is a terminal to which both horizontal and vertical sync signals of the video signal which is input to $e_1$ are input. A decoder 31 separates R (red), G (green) and B (blue) signals from the video signal obtained by scanning, for example, the color image which was input to the input terminal $e_1$. A numeral 39 represents an A/D converter. The R, G and B signals in one vertical interval which are output from the decoder 31 and are obtained by horizontally scanning are sampled by the A/D converter 39 in the direction perpendicular to the horizontal scanning direction and then they are coded. An image processor 40 performs the masking processing of the R, G and B signals input and converts them to each chrominance signal of Y (yellow), M (magenta), C (cyan), and BK (black) and then outputs them. The BK, C, M, and Y signals are stored in line memories 41-1 to 41-4. In addition, the character data such as the date and the like which should be recorded in the blank portion of the recording medium is stored in the leftmost portion which is the hindmost part of the line memory 41-1, while the signal which should be recorded as the image is stored in the memory section other than that. Recording head drive circuits 42-1 to 42-4 convert the respective chrominance digital signals of BK, C, M, and Y to the analog signals and add these analog output signals to recording heads 43-1 to 43-4. A carriage 44 is provided with the ink jet recording heads 43-1 to 43-4. The recording heads 43-1 to 43-4 discharge the color inks of BK, C, M, and Y in response to the analog output signals from the recording head drive circuits 42-1 to 42-4, thereby recording a color image. A numeral 46 is a recording medium; 45 is an image recording region; and 47 is a blank portion. FIG. 3 shows the case where the characters of, for example, "83.4.M.Y" are recorded in that blank portion. A decoder 33 codes the digital signals indicative of the character data of "83.4.M.Y" which is included in the vertical blanking interval of the color video signal. A numeral 34 represents an input unit equipped with a keyboard or the like, which serves to input the character data such as the date and the like which is recorded in the blank portion 47 of the recording medium 46. Namely, the character data can be superimposed into the video signal and can be also input from the outside. A buffer memory 35 stores the signal denoting the coded character data such as the date and the like which is output from the decoder 33 or input unit 34. A character generator 36 generates a character pattern corresponding to the coded signal from the buffer memory 35. This character pattern is stored in a font memory 37. A printer system controller 38 is constituted by a microcomputer and the like. This controller 38 reads out the data of the font memory 37 and stores it in the leftmost portion as the hindmost part of the line memory 41-1. A clock signal generator 32 is energized in response to the sync signals applied to the input terminal $e_2$, thereby allowing the buffer memory 35, A/D converter 39, image processor 40, line memories 41-1 to 41-4, and recording head drive circuits 42-1 to 42-4 to be synchronously made operative. A drive circuit 48 drives a carriage drive motor 49 for scanning the carriage 44. A drive circuit 50 drives a paper feed motor 51 for advancing the recording medium 46.

The operation of the image recording apparatus of the present embodiment mentioned above will now be explained. The color video signal including the analog video signal indicative of the color image of one image field and the digital signal representative of the character data such as the date and the like which is included in the vertical blanking internal is input to the input terminal $e_1$. On the other hand, the sync signals thereof are applied to the input terminal $e_2$. The analog signal is separated to the respective R, G and B signals by the decoder 31, while the digital signal indicative of the character data such as the date and the like is input to the decoder 33. The R, G and B signals separated by the decoder 31 are input to the A/D converter 39. The A/D converter 39 samples the R, G and B signals in one vertical interval in the direction perpendicular to the horizontal scanning direction and digitizes them, thereafter it inputs them to the image processor 40. The image processor 40 performs the masking processing and converts to the respective chrominance signals of Y, M, C, and BK and stores those signals in the portion of the line memory 41-1 excluding the leftmost portion which is the hindmost part thereof and in the line memories 41-2, 41-3 and 41-4.

On the other hand, the coded signal indicative of the character data such as the date and the like from the decoder 33 is input in the buffer memory 35 and is stored therein. The character generator 36 generates the character pattern corresponding to the coded signal of the buffer memory 35 and stores it in the font memory 37. The printer system controller 38 reads out the data stored in the first column of the font memory 37 and transfers it to the leftmost portion which is the hindmost part of the line memory 41-1. Upon completion of the transference, the data of the character pattern stored in the font memory 37 is shifted by one column.

In this way, the recording data of one line consisting of the image information which should be recorded on the recording medium 46 and the character data such as the date and the like which should be recorded in the blank portion 47 is stored in the line memories 41-1 to 41-4. The printer system controller 38 controls the driver 48 to drive the carriage drive motor 49 which performs the horizontal scanning operation of the carriage 44 and the recording head drive circuits 42-1 to 42-4 at timings of the clock signals from the clock signal generator 32. The controller 38 also adds the data stored in the line memories 41-1 to 41-4 into the recording head drive circuits 42-1 to 42-4 and controls amounts of color inks which are discharged from the recording heads 43-1 to 43-4 in response to the analog signals which were D/A converted, thereby recording the image of one line. When the recording head 43-1 disposed at the right end of the carriage 44 is scanned in the direction of the arrow b and reaches the boundary point between the image recording region 45 and the blank portion 47 of the recording medium 46, the recording of the image recording information which should be recorded in the image recording region 45 stored in the line memory 41-1 has been finished. Thereafter, the recording heads 43-2 to 43-4 arranged in the carriage 44 are located on the image recording region 45 and continue the recording of the image. However, the recording head 43-1 is located on the blank portion 47 and records the character data such as the date and the like stored in the leftmost portion as the hindmost part of the line memory 41-1 by discharging the BK ink.

As described above, while the recording heads 43-2 to 43-4 are located on the image recording region 45 and are recording the image, the character data such as the date and the like is recorded by use of the recording head 43-1 which is located on the blank portion 47. Therefore, the character data such as the date and the like can be recorded in the blank portion 47 without elongating the recording time to record the image.

In this way, the image of one line is recorded and the character data such as the date and the like is recorded, thereafter the printer system controller 38 energizes the driver 50 to drive the paper feed motor 51, thereby advancing the recording medium 46 by one line in the direction of the arrow a for preparation of the recording of the next one line. By repeating the above-explained operations, the recording of the image and the character data such as the date and the like in the image recording region 45 and blank portion 47 of the recording medium 46 is completed.

Figure 4:
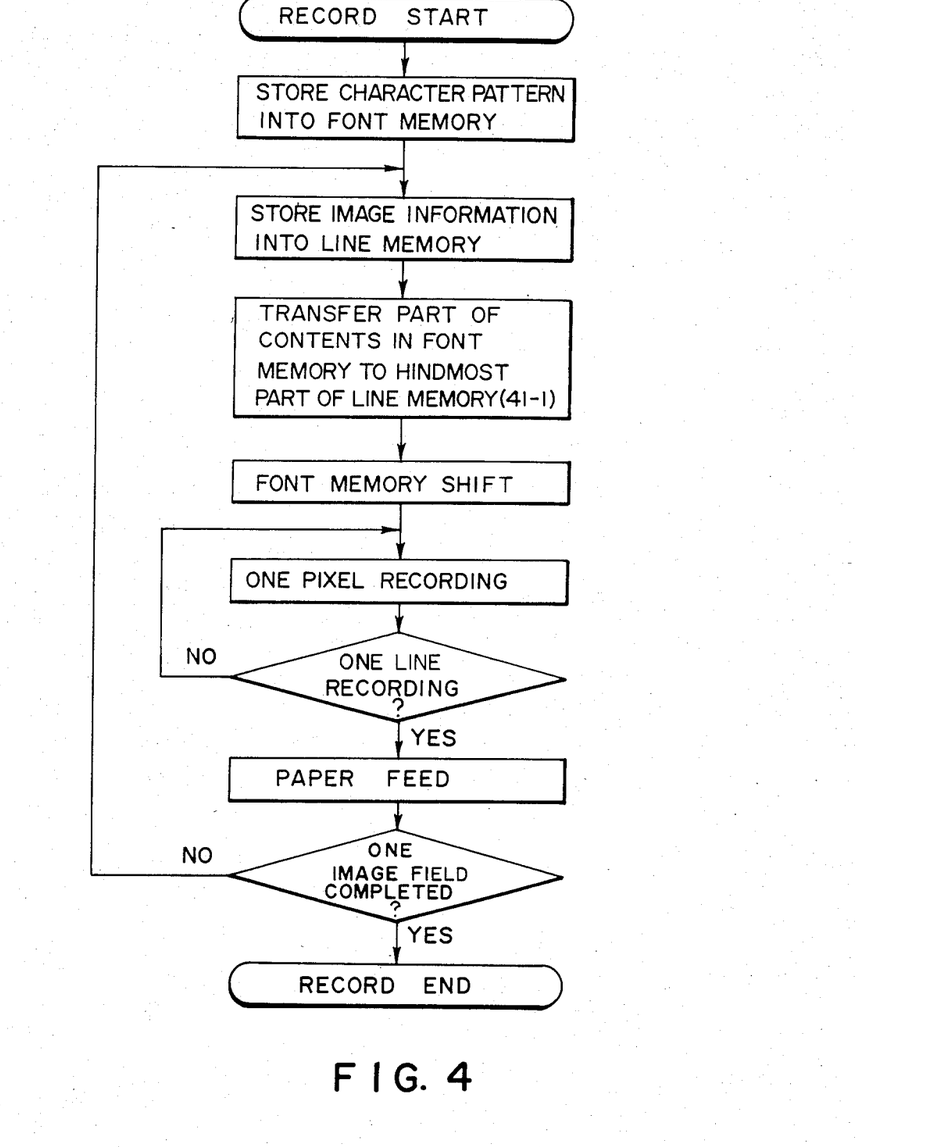
FIG. 4 is a flowchart showing the sequence of the operations of the image recording apparatus shown in FIG. 3.

With reference to the flowchart of FIG. 4, it will be described the case where a color image drawn on a paper or the like is scanned and it is recorded in the image recording region 45 of the recording medium 46 and further the character data such as the date and the like, for example, "83.4.M.Y" is recorded in the blank portion 47 of the recording medium 46. The character data from the decoder 33 or the character data from the input unit 34 equipped with the keyboard or the like is input in the buffer memory 35, and the buffer memory 35 codes the character data and stores it. The character generator 36 generates the character pattern in response to the coded signal of the buffer memory 35 and stores it into the font memory 37. The video signal applied to the input terminal $e_1$ is input to the decoder 31 and the R, G and B signals are separated by the decoder 31, and they are applied to the A/D converter 39. After the A/D converter 39 sampled the input signals and digitized them, it inputs the digital signals to the image processor 40. The image processor 40 performs the masking process of the input digital signals for color correction of Y, M, C, and BK, then it stores those signals into the line memories 41-1 to 41-4. In addition, the leftmost portion which is the hindmost part of the line memory 41-1 is used to store the character data such as the date and the like which is recorded in the blank portion 47 of the recording medium 46. The printer system controller 38 reads out the character data such as the date and the like stored in the first column of the font memory 37 and transfers it to the leftmost portion as the hindmost part of the line memory 41-1 and stores it therein. Upon completion of transference, the data of the character pattern in the font memory 36 is shifted by one column.

In this way, the image information of one line and the character data such as the date and the like which were stored in the line memories 41-1 to 41-4 are fetched in accordance with the command signals from the printer system controller 38 and are converted to the analog values by the recording head drive circuits 42-1 to 42-4. Thus, the data of one line is recorded by the recording heads 43-1 to 43-4. After completion of the recording, the recording medium 46 is advanced by one line in the direction of the arrow a. By repeating the above-mentioned operations, the recording of one image field is completed. Even in this case, it is possible to record the character data such as the date and the like in the blank portion 47 while the image is being recorded in the image recording region 45 of the recording medium 46.

In an arrangement of a plurality of recording heads, it is generally desirable to arrange the recording head 43-1 so as to record the character data with the ink of the color which can be easily read, such as a black ink, in the blank portion 47. However, it is also possible to arrange the recording head 43-1 so as to discharge any other color ink in consideration of the base color of the recording medium 46.

In the foregoing embodiment, it has been described the case where the character data such as the date and the like is recorded on the right side of the blank portion 47 with respect to the paper feeding direction of the recording medium 46. However, the character data such as the date and the like can be also recorded on the left side of the blank portion 47 regarding the paper feeding direction of the recording medium 46. In this case, the data output from the font memory 37 has to be stored in the head part of the line memory 41-4; also, in case of recording with a black ink, it is necessary to constitute the recording head 43-4 at the left end of the carriage 44 so as to discharge the black ink.

Figure 5:
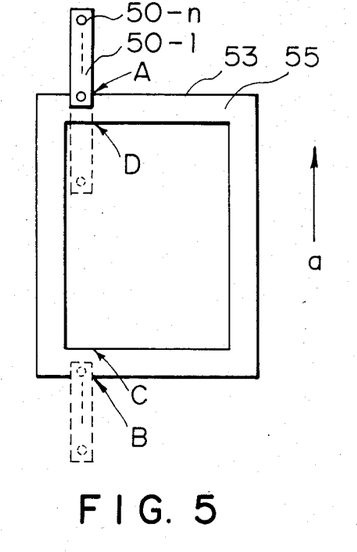
FIG. 5 is a plan view to explain a recording medium and the scanning state of recording heads according to another embodiment of the invention.

FIG. 5 shows another embodiment of the present invention.

In this diagram, recording heads 50-1 to 50-n are arranged in parallel with the feeding direction a of the recording medium 53. In this arrangement, while the recording head 50-n is located between A to D, the character data such as the date and the like can be recorded on the upper side of a blank portion 55 of a recording medium 53 by use of the recording head 50-n. On the other hand, while the recording head 50-1 is located between D and C, the character data such as the date and the like can be recorded on the lower side of the blank portion 55 of the recording medium 53 using the recording head 50-1.

Figure 6:
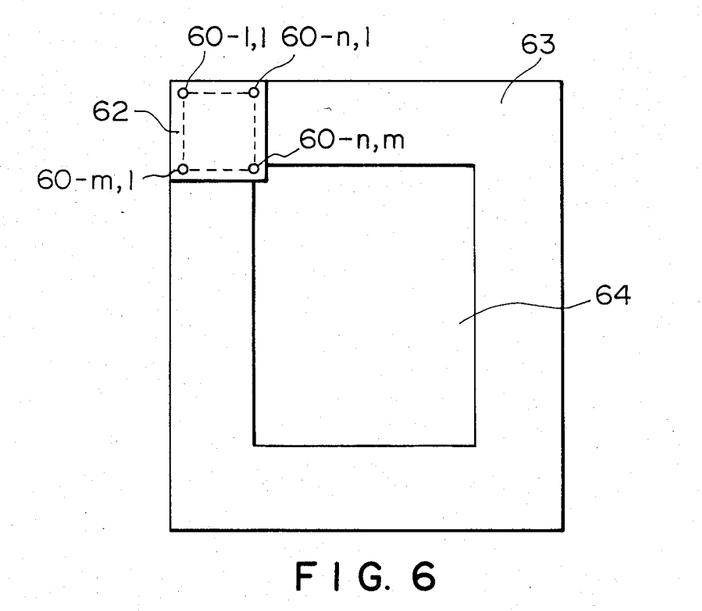
FIG. 6 is a plan view illustrating recording heads which are arranged two-dimensionally according to further another embodiment of the invention.

FIG. 6 shows further another embodiment of the present invention.

In this diagram, recording heads 60-1,1 to 60-m,n (total m x n heads) are two-dimensionally arranged as a matrix of (m, n) type. A reference numeral 62 denotes a carriage; 63 is a blank portion; and 64 is an image recording region. In this embodiment, while the image is being recorded in the image recording region 64, the character data such as the date and the like can be recorded in arbitrary positions of the blank portion 63 by use of the recording heads which are located on the blank portion 63 of the recording medium.

As described above, there have been described the cases where the recording medium is fixed and the recording heads are scanned in the horizontal or vertical directions in the embodiments shown in FIGS. 3, 5 and 6 of the present invention. However, it is also possible to have the recording heads fixed while the recording medium is scanned horizontally or vertically, thereby recording an image and character data such as the date and the like. This arrangement is appropriate in the case where it is impossible to scan the recording heads, such as in the continuous type ink jet or the like.

Further, in case of performing the recording in the blank portion of the recording medium, the recording heads are not limited to the heads which are disposed at the rightmost end, leftmost end, top end, or bottom end of the carriage, but it is possible to record the character data such as the date and the like in the blank portion by use of a plurality of recording heads which are located on the blank portion while the image is being recorded using the recording heads which are located on the image recording region of the recording medium.

In addition, although the ink jet recording heads were used as the recording heads in the foregoing embodiments, other types of recording heads, for instance, thermal heads, electrostatic recording heads, etc. may be used.

As described above, according to the present invention, the character data such as the date and the like is recorded in the blank portion by use of the recording heads which are located on a blank portion other than an image recording region of the recording medium after a plurality of recording heads started scanning in the direction of arrangement thereof or before the end of scanning. Therefore, the character data such as the date and the like can be recorded in the blank portion within the recording time for recording the image.

Also, since the data is recorded in the blank portion, the data can be certainly confirmed and artistic sense of the image recorded is not lost.

Although the present invention has been shown and described with respect to preferred embodiments, various changes and modifications which are obvious to a person skilled in the art to which the invention pertains are deemed to lie within the spirit and scope of the invention.

What is claimed is:

1. An image recording apparatus for recording an image on a recording medium, comprising:
    image signal generating means for obtaining an image signal which represents an image to be recorded in a predetermined area on the recording medium;
    additional signal generating means for obtaining an additional signal which represents additional data to be recorded outside the predetermined area on the recording medium;
    recording means including a plurality of recording elements for recording on the recording medium in response to the signals from said image signal generating means and said additional signal generating means, wherein at least one other recording element, which does not record additional data, scans the predetermined area during the recording of the additional data;
    scanning means for providing relative movement between said recording means and the recording medium, the predetermined area being defined by the relative movement of said recording means and the recording medium; and
    control means for applying the additional signal to at least one of said plurality of recording elements when said at least one recording element scans the recording medium outside the predetermined area, such that said at least one recording element records the additional data outside the predetermined area on the recording medium.

2. An image recording apparatus according to claim 1, wherein said plurality of recording elements comprise ink jet recording heads for discharging ink droplets.

3. An image recording apparatus according to claim 1, wherein said plurality of recording elements are two dimensionally arranged.

4. An image recording apparatus according to claim 1, wherein the additional signal includes data such as characters and the like regarding a date.

5. An image recording apparatus according to claim 9, wherein said plurality of recording elements are arranged parallel to the relative scanning direction provided by said scanning means.

6. An image recording apparatus according to claim 5, wherein said plurality of recording elements record respective different colors.

7. An image recording apparatus according to claim 6, wherein at least one of said plurality of recording elements records black.

8. An image recording apparatus according to claim 7, wherein said recording element for recording black is arranged at the endmost portion in the arrangement of said plurality of recording elements.

9. An image recording apparatus for recording an image on a recording medium, comprising:
    image signal generating means for obtaining an image signal which represents an image to be recorded in a predetermined area on the recording medium;
    additional signal generating means for obtaining an additional signal which represents additional data to be recorded outside the predetermined area on the recording medium;
    recording means including a plurality of recording elements for recording on the recording medium in response to the signals from said image signal generating means and said additional signal generating means, wherein said plurality of recording elements comprise ink jet recording heads for discharging ink droplets;
    scanning means for providing relative movement between said recording means and the recording medium, the predetermined area being defined by the relative movement of said recording means and the recording medium; and
    control means for applying the additional signal to at least one of said plurality of recording elements when said at least one recording element scans the recording medium outside the predetermined area, such that said at least one recording element records the additional data outside the predetermined area on the recording medium.

10. An image recording apparatus for recording an image on a recording medium, comprising:
    image signal generating means for obtaining an image signal which represents an image to be recorded in a predetermined area on the recording medium;
    additional signal generating means of obtaining an additional signal which represents additional data to be recorded outside the predetermined area on the recording medium;
    recording means including a plurality of recording elements for recording on the recording medium in response to the signals from said image signal generating means and said additional signal generating means, wherein said plurality of recording elements are two-dimensionally arranged;
    scanning means for providing relative movement between said recording means and the recording medium, the predetermined area being defined by the relative movement of said recording means and the recording medium; and
    control means for applying the additional signal to at least one of said plurality of recording elements when said at least one recording element scans the recording medium outside the predetermined area, such that said at least one recording element records the additional data outside the predetermined area on the recording medium.

11. An image recording apparatus for recording an image on a recording medium, comprising:
    image signal generating means for obtaining an image signal which represents an image to be recorded in a predetermined area on the recording medium;

additional signal generating means for obtaining an additional signal which represents additional data to be recorded outside the predetermined area on the recording medium, wherein the additional signal includes data such as characters and the like regarding a date;

recording means including a plurality of recording elements for recording on the recording medium in response to the signals from said image signal generating means and said additional signal generating means;

scanning means for providing relative movement between said recording means and the recording medium, the predetermined area being defined by the relative movement of said recording means and the recording medium; and control means for applying the additional signal to at least one of said plurality of recording elements when said at least one recording element scans the recording medium outside the predetermined area, such that said at least one recording element records the additional data outside the predetermined area on the recording medium.

12. A color image recording apparatus for recording a color image on a recording medium, comprising:

color image signal generating means for obtaining a color image signal which represents a color image to be recorded in a predetermined are on the recording medium;

additional signal generating means for obtaining an additional signal which represents additional data to be recorded outside the predetermined area on the recording medium;

recording means including a plurality of recording elements for recording on the recording medium with a plurality of colors in response to the signals from said color image signal generating means and said additional signal generating means, wherein said plurality of recording elements comprise ink jet recording heads for discharging ink droplets;

scanning means for providing relative movement between said recording means and the recording medium, the predetermined area being defined by the relative movement of said recording means and the recording medium; and control means for applying the additional signal to at least one of said plurality of recording elements when said at least one recording element scans the recording medium outside the predetermined area, such that said at least one recording element records the additional data outside the predetermined area on the recording medium.

13. A color image recording apparatus according to claim 12, wherein at least one other recording element, which does not record additional data, scans the predetermined area during the recording of the additional data.

14. A color image recording apparatus for recording a color image on a recording medium, comprising:

color image signal generating means for obtaining a color image signal which represents a color image to be recorded in a predetermined area on the recording medium;

additional signal generating means for obtaining an additional signal which represents additional data to be recorded outside the predetermined area on the recording medium;

recording means including a plurality of recording elements for recording on the recording medium with a plurality of colors in response to the signals from said color image signal generating means and said additional signal generating means, wherein at least one other recording element, which does not record additional data, scans the predetermined area during the recording of the additional data;

scanning means for providing relative movement between said recording means and the recording medium, the predetermined area being defined by the relative movement of said recording means and the recording medium; and control means for applying the additional signal to at least one of said plurality of recording elements when said at least one recording element scans the recording medium outside the predetermined area, such that said at least one recording element records the additional data outside the predetermined area on the recording medium.

15. An image recording apparatus according to claim 17, wherein said plurality of recording elements are arranged parallel to the relative scanning direction provided by said scanning means.

16. An image recording apparatus according to claim 15, wherein said recording element for recording the additional data is arranged at the endmost portion in the arrangement of said plurality of recording elements.

17. An image recording apparatus according to claim 16, wherein said recording element for recording the additional data records black.

18. A color image recording apparatus according to claim 14, wherein the additional signal includes data such as characters and the like regarding a date.

19. A color image recording apparatus for recording a color image on a recording medium, comprising:

color image signal generating means for obtaining a color image signal which represents a color image to be recorded in a predetermined area on the recording medium;

additional signal generating means for obtaining an additional signal which represents additional data to be recorded outside the predetermined area on the recording medium, wherein the additional signal includes data such as characters and the like regarding a date;

recording means including a plurality of recording elements for recording on the recording medium with a plurality of colors in response to the signals from said color image signal generating means and said additional signal generating means;

scanning means for providing relative movement between said recording means and the recording medium, the predetermined area being defined by the relative movement of said recording means and the recording medium; and control means for applying the additional signal to at least one of said plurality of recording elements when said at least one recording element scans the recording medium outside the predetermined area, such that said at least one recording elements records the additional data outside the predetermined area on the recording medium.

* * * * *